US008347084B2

(12) United States Patent
Tavernier et al.

(10) Patent No.: US 8,347,084 B2
(45) Date of Patent: Jan. 1, 2013

(54) INFORMATION TRANSMISSION SECURITY METHOD

(75) Inventors: Cedric Tavernier, Fontenay Sous Bois (FR); Herve Aiache, Dugny (FR)

(73) Assignee: Thales, Neuilly sur Seine (FR)

( * ) Notice: Subject to any disclaimer, the term of this patent is extended or adjusted under 35 U.S.C. 154(b) by 297 days.

(21) Appl. No.: 12/524,608

(22) PCT Filed: Jan. 24, 2008

(86) PCT No.: PCT/EP2008/050831
§ 371 (c)(1),
(2), (4) Date: Dec. 1, 2009

(87) PCT Pub. No.: WO2008/095788
PCT Pub. Date: Aug. 14, 2008

(65) Prior Publication Data
US 2010/0088511 A1    Apr. 8, 2010

(30) Foreign Application Priority Data
Jan. 26, 2007    (FR) ..................... 07 00555

(51) Int. Cl.
*H04L 29/06*    (2006.01)

(52) U.S. Cl. ............... 713/162; 713/1; 380/30; 370/342

(58) Field of Classification Search .................. 713/162, 713/1; 380/30
See application file for complete search history.

(56) References Cited

U.S. PATENT DOCUMENTS

| 7,058,796 | B2 * | 6/2006 | Lynn et al. ......................... 713/1 |
| 7,346,162 | B2 * | 3/2008 | Slavin ............................. 380/30 |
| 2002/0044542 | A1 * | 4/2002 | Kim ............................. 370/342 |
| 2004/0068647 | A1 | 4/2004 | Hariharan et al. |

FOREIGN PATENT DOCUMENTS

WO    9748207 A1    12/1997

OTHER PUBLICATIONS

Alabbadi, et al, 1992. "Integrated security and error control for communication networks using the McEliece cryptosystem." IEEE International Carnahan Conference on Crime Countermeasures, Proceedings, Security Technology, pp. 172-178.
Jiang, et al, 2005. "A novel mix-based location privacy mechanism in Mobile IPv6." Computers & Security 24(8): 629-641.

* cited by examiner

*Primary Examiner* — Nathan Flynn
*Assistant Examiner* — Phuoc Tran
(74) *Attorney, Agent, or Firm* — Stroock & Stroock & Lavan LLP

(57) ABSTRACT

A method for securing the transmission of information in a communication network comprising a plurality of nodes, characterized in that it includes the steps of: an information transmitting node encodes the information with a given code; an error of given weight is added to the encrypted information; the encrypted information and the error are divided into a number of portions that is substantially equal to a chosen number r of possible routes for transmitting the information in the network; the destination address is encrypted; and for each portion, a control information item is associated, making it possible to reconstruct the message at the destination and the encrypted address of the destination node. For the various sets, each including a portion of encrypted information, a control information item and the encrypted address of the recipient node are sent in parallel over the r chosen routes.

9 Claims, 7 Drawing Sheets

$$X = 0, 1, 2, 3, \ldots N-1$$

$$\begin{matrix} P_0(X) \\ P_1(X) \\ \vdots \\ P_{k-1}(X) \end{matrix} \quad (P_i(j))_{(i,j)} \quad = RS[N, k, N-k+1]$$

$$\text{Message} = a_0 P_0(X) + a_1 P_1(X) + \ldots + a_{k-1} P_{k-1}(X) = P(X).$$

INFORMATION TRANSMISSION SECURITY METHOD

CROSS REFERENCE TO RELATED APPLICATIONS

The present application is the U.S. National Phase of International Patent Application Serial No. PCT/EP2008/050831, filed on Jan. 24, 2008, which claims the benefit of French Patent Application Serial No. 07/00555, filed on Jan. 26, 2007, both of which are hereby incorporated by reference in their entireties.

BACKGROUND OF THE INVENTION

1. Field of the Invention

The present invention relates to security in networks.

The scope of the present invention covers, notably, the routing protocol, anonymity and protection of the information, in wired communication networks and wireless networks.

2. Prior Art

In wireless networks, the constraints are high, there is low computation capacity, transmission problems (noise-affected channels) and weak flows. One of the problems is to find an effective solution that could be close to real time (low latency) with protection of the information, that is to say that a hacker cannot understand the information when he manages to intercept it, a guarantee of anonymity, that is to say that a hacker cannot know who is talking with whom, and privacy is maintained without affecting the quality of the traffic, that is to say without adding excessive latency.

The conventional encryption systems with public keys used to encrypt the address of the recipient node and the information itself are generally very slow in relation to the needs of the applications. The prior art discloses a number of solutions that use private key encryption systems. However, these solutions do not offer adequate security, because each node of the network needs to know the private key of the others. Thus, when a node is corrupted, the security of the network collapses.

The document by William Luh, Deepa Kundur, "Distributed Privacy for Visual Sensor Networks via Markov Shares". *In Proceedings of the Second IEEE Workshop on Dependability and Security in Sensor Networks and Systems,* 2006, discloses a method which divides up the information before transmitting it. This solution protects the information, only if it is assumed that the hacker can intercept a small fraction of the information, and this assumption is improbable in a wireless context. The second drawback is anonymity: the latter is not guaranteed since the authors give no solution for concealing the addresses of the nodes.

The document by V. M. Sidel'nikov. entitled "A public-key cryptosystem based on Reed-Muller codes" *Discrete Mathematics and Applications,* 4(3):191-207, 1994 also describes a public key encryption system which uses the property of the Muller codes and retains the principle of adding a random error of fixed weight. The performance of such an algorithm is still weak when looking at real time or close to real time applications. This article discloses an algorithm which is more restrictive. The length of the key is always important and the complexity of encryption of a message is greater if the high security is to be maintained. The final point is that this public key encryption system is probabilistic. There is a non-zero probability that the recipient of the message will not succeed in decrypting the message.

The patent application WO 97/48207 discloses a system that can be used to dynamically encrypt a piece of information including date and voice. This encrypted information is not, however, divided up into a plurality of packets.

The publication "Integrated Security and Error Control for Communication Networks using the Mc Eliece Cryptosystem" concerns improving the Goppa code used in the Mc Eliece public key encryption system.

Currently, the systems described in the prior art do not adequately resolve the problems of protection of the transmission in a wireless information transmission network and do not address the problem of the anonymity of the sender and of the receiver.

SUMMARY OF THE INVENTION

The subject of the invention relates to a method for securing the transmission of information in a communication network comprising a plurality of nodes, characterized in that it comprises at least a combination of the following steps:—
 an encoded piece of information is transmitted, with an error added to it, in a number of fractions, over a plurality of independent paths in the network, each fraction being associated with the encrypted address of the recipient node and with a control information item for restoring the information transmitted.

The inventive method can be summarized notably by the following steps:
 the information is encoded, for example with a Reed-Solomon code of length n and of dimension k, or any other code having properties similar (minimum distance and difficulty in reconstructing an excessively noise-affected transmitted word) to the latter. The encoded information also comprises the address of the recipient node and useful information for reconstructing the message,
 the information is split up and distributed in a plurality of different packets before it is transmitted. The number of portions or fractions distributed depends on the security parameters, on the possible routes for transmitting information in the network. The division protocol used generates a plurality of portions consisting of one portion of the encoded information and a control information item comprising at least the position of this portion in the initial encoded information and the encrypted address of the recipient node of the information.

According to an embodiment, the method adds an error depending notably on the capacity of the channel and on the security parameters targeted by a given application.

The method can also add extra traffic not including useful information in order to optimize the protection of the information. This extra information makes it more difficult to intercept portions of the encrypted information because it renders a true communication between two users indistinguishable from false network communications.

The inventive method notably offers the following benefits:
 A solution that is compatible with a noise-affected channel, that protects the information since it is impossible to differentiate the useful information from the extra traffic introduced,
 Anonymity of the sending user and of the receiving user, since the addresses of the nodes are encrypted,
 The use of a number of different paths for transmitting the different portions of the encrypted information increases the difficulty for a hacker in intercepting all the portions and working back to the initial information.
 The inventive method can be implemented at the lowest level, namely the signal carrying information exchanged between the nodes.

BRIEF DESCRIPTION OF THE DRAWINGS

Other features and benefits of the present invention will become apparent from reading the following description of an exemplary embodiment given by way of illustration and in a non-limiting way, with appended figures which represent.

DETAILED DESCRIPTION OF THE INVENTION

Figure 4:
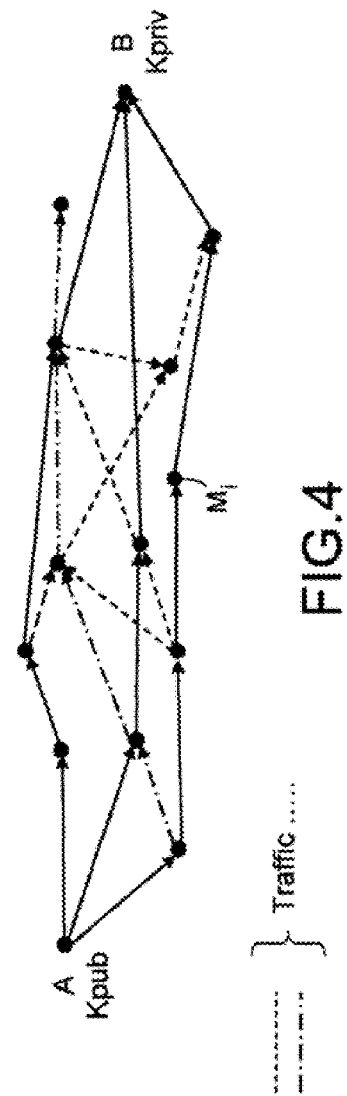
FIG. 4, an exemplary implementation of the method in the case of a transmission of information between two nodes of a network comprising intermediate nodes, FIG. 5, the generation of an exemplary encoding matrix, FIG. 6, the generation of the public key and of the private key from the matrix described in FIG. 5, FIG. 7, a scheme for reducing the length of the public key generated in FIG. 6, FIGS. 8 and 9, an exemplary encoding and decoding structure with use of the key found in FIG. 6.

In order to better understand the principles implemented in the invention, the description is given for a communication network comprising a plurality of nodes Mi interlinked by edges, as described in FIG. 4.

To sum up, the idea behind the present invention relates to a method for transmitting information in total security in a network comprising a plurality of nodes, each of the nodes being provided with a processor that is suitable for implementing the steps described hereinbelow.

With the information having to be transmitted from a source node A to a destination node B, it may pass through a plurality of nodes called "intermediate nodes" Mi in the description.

Figures 1, 3:
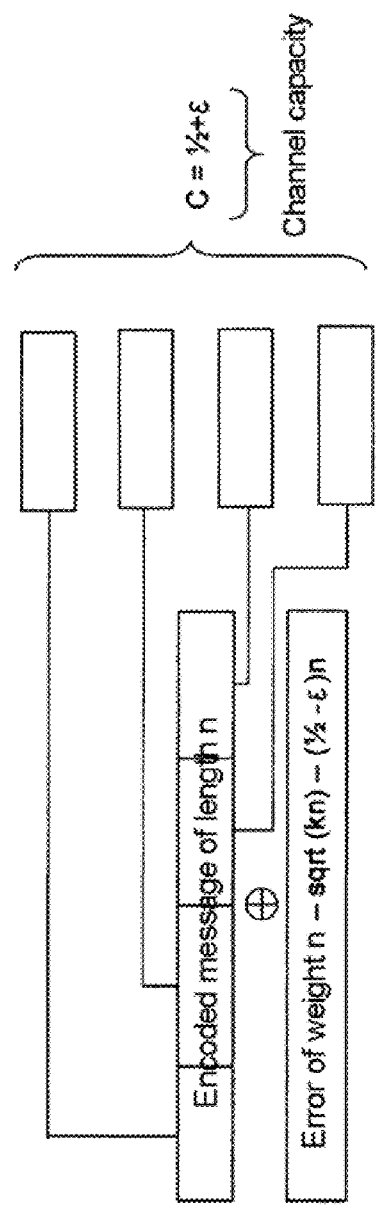
FIG. 1, a diagram reviewing encoding using the Reed-Solomon code.
FIG. 3, the addition of a random error of fixed Hamming weight.
Figure 2:
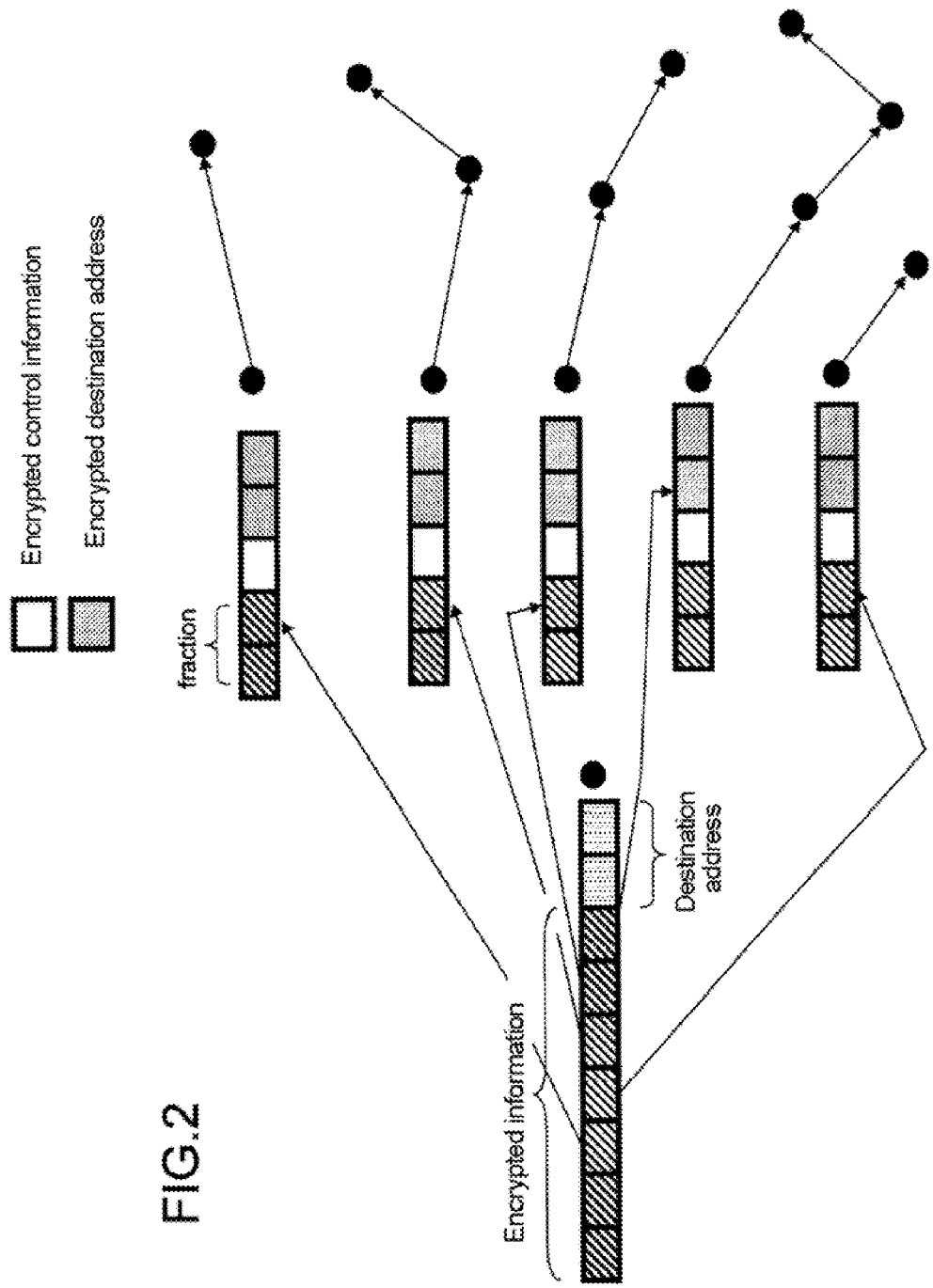
FIG. 2, a block diagram of the division of the encoded information before transmission and of the distribution of the duly obtained information portions between the frames to be transmitted.

The information INF to be transmitted takes the form of a data frame. The source or sending node A encodes the information, for example, by using a Reed-Solomon code, or any other code having properties similar to the latter (in terms of minimum distance and of difficulty in decoding an excessively noise-affected code word). FIG. 1 summarizes the Reed-Solomon encoding known to those skilled in the art.

FIG. 1 diagrammatically represents a non-systematic Reed-Solomon code of length N and dimension k, RS[N,k, N−k+1], defined on an alphabet of dimension 8 (Galois Field GF(2,8), each element of this alphabet can be represented by an octet).

Reed-Solomon code=RS[length=N, dimension=k, minimum distance=N−k+1].

This code is defined over a finite field GF(p,l), where p is a prime number, in the example p=2 et l=8. To encode a message m, the method executes a product between the message which is a matrix comprising a row and k columns by a matrix generating RS[N,k,N−k+1], the result is an encoded vector of length N octets. The message is equal to $a_0 P_0(X)+ a_1 P_1(X)+ \ldots +a_{k-1} P_{k-1}(X)=P(X)$. Thus, the encoded message is: $(P(0), P(1), P(2), \ldots, P(N-1))$.

The method adds a random error of Hamming weight Tb to this encoded vector. The error-addition step is illustrated, for example, in FIG. 3. Finally, the new encoded message that is to be divided up so as to transmit it over a plurality of paths of the network that are independent of one another is obtained.

The information encoded after this first step is divided up into a plurality of message fractions. The method uses a splitting procedure above the routing protocol. This makes it possible, notably, to increase the difficulty for a hacker to reconstruct all of the information. The number of fractions or portions of information is determined, for example, as follows: a sending node uses a computation algorithm known to those skilled in the art to determine all the possible routes for routing the information in the network. The number of information portions can be equal to the number of possible routes found in this way. The number of portions can also take account of the number of possible routes, of the traffic quality, of the overused routes, of bandwidth, etc. The route computation algorithm is known to those skilled in the art and will not therefore be detailed. The number of portions is in all cases less than a given value.

A route computation algorithm is, for example, described in the document by E. Dijkstra: "A Node on Two Problems in Connexion with Graphs", Numerische Mathematik, Vol. 1, 1959, pp. 269-271 or in the document by Richard Bellman, entitled "On a Routing Problem", in Quarterly of Applied Mathematics, 16 (1), pp. 87-90, 1958.

The inventive method uses a splitting procedure above the routing protocol. Thus, each node Si which belongs to a path between the source A and the destination B must decrypt the address of the destination node and use the address of the node to encrypt the next node on this path. The configuration in which all the routes between the sender and the recipient are separate ensures greater security in communications. FIG. 4 gives an example of to transmission of an encoded message between a user A and a recipient B. The structure of a frame used to transmit the messages is represented in the table below. It has, for example, a length of N octets.

Thus, if the method can send the information by using t different paths, then it must encode t messages m that belong to a single communication so as to transmit t frames over the t determined paths.

| N octets of encoded information. These N octets represent t packets of N/t octets. Each packet has a determined place in the initial message | Control information: an integer which represents the place of the packets in each code message of origin m and the number of consecutive encoded messages. This information is encrypted with a public key system. | The encrypted address of the recipient node. |
|---|---|---|

In the case where the total message sent by the sender S has a length that is different from a multiple of the determined number of paths t, the method uses a technique known to those skilled in the art known as padding.

This technique can be used to complete the message by adding a number of octets equal to zero. The method adds this information to the place reserved for information control. The information control field can be completed according to the needs of the application, for example, if the information must by inserted at a very low level of the application, then the control information should be more important than if the implementation is done at a very high level. This control information comprises, for example, the synchronization information and, more generally, any information that may be useful to the reconstruction of the message. Since this control information is known to those skilled in the art, it will not be detailed exhaustively.

Encryption of the Control Information and of the Address of the Node

The method here uses a public key encryption system. This encryption can encrypt messages of size dim=u·$\Sigma_{(i=0 \to i=r)}$ Binomial(i,m) since it is precisely the dimension of the public key of the Mceliece-Sidelnikov public encryption system. For example, if m=9, u=4 then the dimension is equal to 184; if m=10 and u=2, then the dimension is equal to 112.

These parameters ensure good security. In this message of dim bits, the method encrypts the address of the recipient node D, the control information and a random variable of size R. The value of R depends on the moving frequency of the private and public keys so as to retain a high security level. Typically, if R is fixed, the method encrypts $2^R$ times without altering the security level. Thus, the encrypted message will have a length L=u·($2^m$−E) where E is the number of erasures to be considered as described hereinbelow with FIG. 7.

For example, if m=9, u=4, E=200, then dim=184, L=1248 and it is possible to consider a number of errors equal to 220. These parameters make it possible to obtain security greater then $2^{80}$.

The method comprises a step during which there is added an error of weight that is determined notably by taking account of the capacity of the channel. This step is represented in FIG. 3. The method dynamically evaluates the capacity of the channel (adaptive decoding), then, depending on the quality of the channel, the method adds random errors of fixed weight in order to set the security from an information reconstruction point of view.

For example, with the encoded message having a length n and the capacity of the channel being expressed as C=½+ε, the message has added to it a random error of fixed weight n−sqrt(kn)−(½−ε)n, which represents the square root, k is the dimension of the Reed-Solomon code.

Effective list decoding algorithms are available for Reed-Solomon codes and can correct n−sqrt(kn) errors where sqrt a complexity of the order of $n^2$ log(n) operations in the field Fq. There are also some that provide a flexible decoding.

The encryption is a public key encryption, known to those skilled in the art, the principles of which are reviewed hereinbelow.

Each node Si has an address Ai, a public key Kpvi and an associated private is key Kpri. Let fun be the public key encryption function. If S1 is the node sending a piece of information INF and S4 is the recipient, the route is then made up of the nodes S2 and S3, S1 therefore sends the following encrypted message (fun(Kpv4,(INF,A1)),fun(Kpv3,A4),fun(Kpv2,A3)) to S2. The node S2 then performs the operation fun(Kpr2,fun(Kpv2,A3))=A3, S2 can therefore send the message (fun(Kpv4,(INF,A1)),fun(Kpv3,A4)) to S3. Similarly, S3 deduces the final destination address A4=fun(Kpr3,fun(Kpv3,A4)). Finally, S4 receives the information fun(Kpv4,(INF,A1)) from S3, S4 performs the final operation fun(Kpr4,fun(Kpv4,(INF,A1)))=(INF,A1). S4 therefore receives the information and the address of the source.

The routing protocol used is adapted to determine a plurality of paths between a source S and a destination D. Thus, based on the knowledge of an overall routing, it uses an effective decision algorithm to offer a better management of the resources, in order to increase the flow transmission performance.

FIG. 4 diagrammatically represents an exemplary implementation of the inventive method in the case of two users in a network, Alice and Bob, wanting to communicate. Alice A wants to transmit a message m to Bob B. Alice needs to find different paths to transmit the information and encodes the message by using her public key. After encoding and using an appropriate algorithm, she transmits the message portions accompanied by the encoded address of the recipient node and the control information, the last two of these being encoded.

Each node that belongs to the path between A and B must decrypt the address of B with its private key and encode the address with the public key of the next node, then the information can be transmitted to this next node. When Bob receives a message, he uses his private key to decrypt the control information and the address of the node, and when he receives all the packets of the single message, m, he decodes it by applying an algorithm known to those skilled in the art, for example that described in the document by Venkatesan Guruswami and Madhu Sudan, "Improved decoding of Reed-Solomon codes and algebraic-geometry codes", *IEEE Transactions on Information Theory*, 45 (6): 1757-1767, September 1999, or even, for a very low level implementation, close to the signal in the document by Ralf Koetter, Alexander Vardy: "Algebraic soft-decision decoding of Reed-Solomon codes" IEEE Transactions on Information Theory 49 (11): 2809-2825 (2003).

Without departing from the framework of the invention, the inventive method can be used in any wireless transmission system that demands a level of security in transmission. Any communication system demanding high security constraints can implement it.

Figure 5:
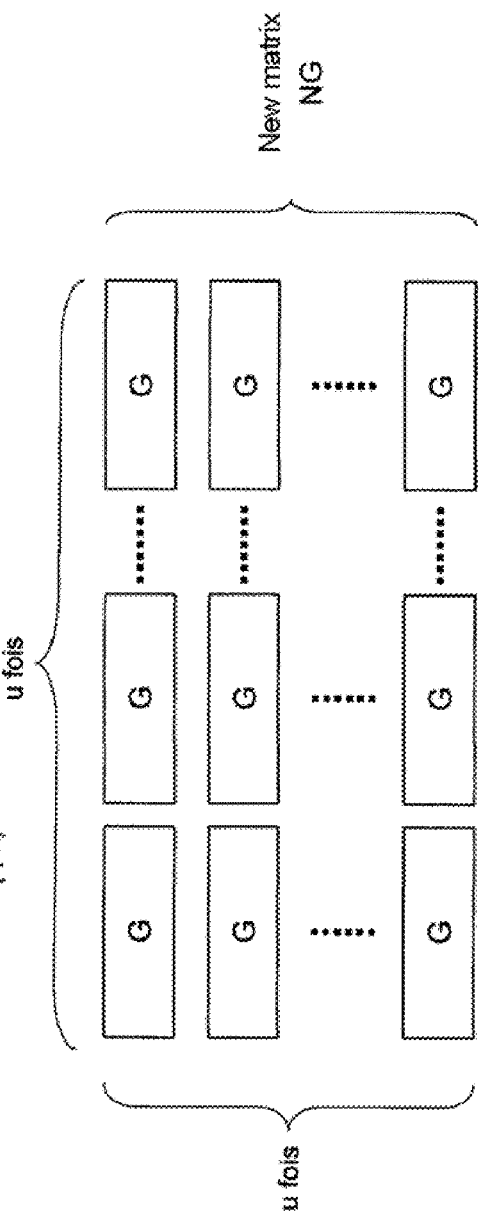
Figure 6:
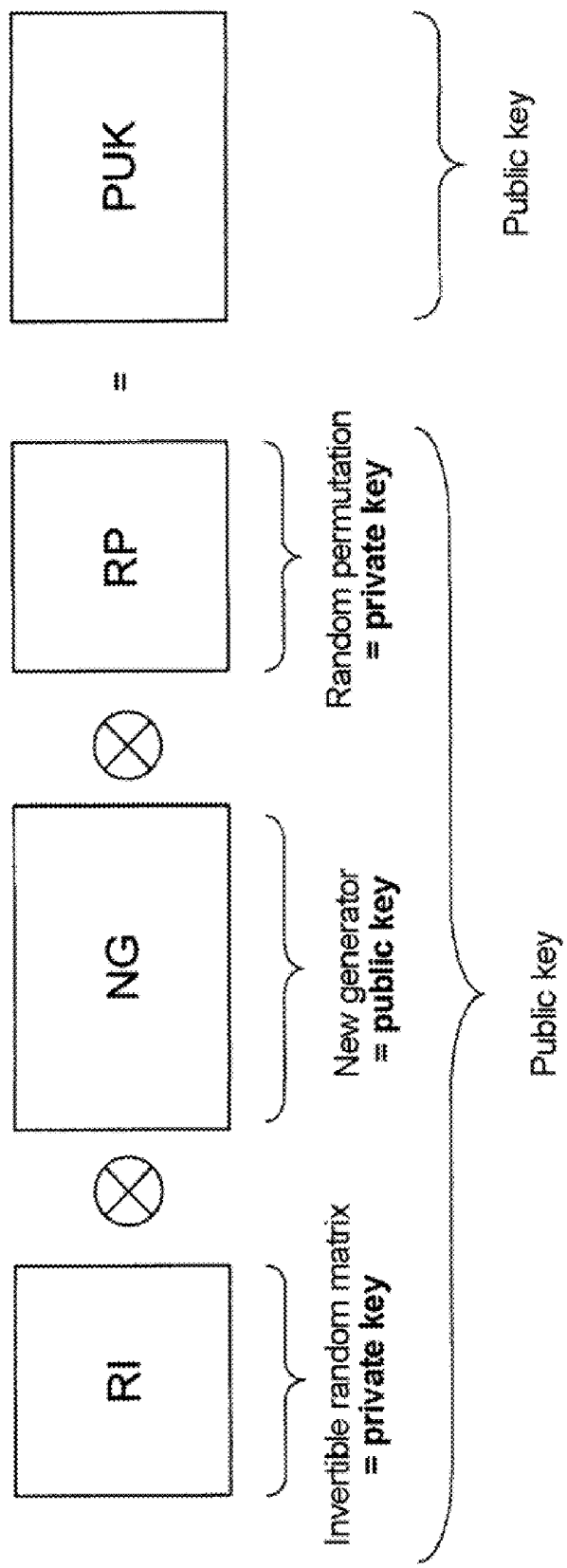

According to an embodiment, the inventive method uses a specific private key obtained in relation to FIGS. 5 and 6.

FIG. 5 represents the generation matrix NG used for the encryption or encoding of the information to be transmitted.

Let C be a q-area t-correcting linear code of length n, of dimension k, CWq(n, t) be all the words of $F^n_q$ of Hamming weight t. (Public key cryptosystems based on Nicolas Sendrier's error correcting codes in the context of a paper for authorization to direct research, specialty: information technology, University of Pads Mar. 6, 2002).

G is a public key generation matrix, with x belonging to $F^n_q$ the encryption is defined as follows:

$$y=xG+e; w_H(e)=t$$

y is a vector, e corresponds to an error of weight t that will be chosen at the time of encryption, w corresponds to the Hamming weight, the index H to the to Hamming word and t to the error.

The code generation matrix designated NG according to the invention is a matrix comprising u rows and v columns, with u=v, an element of the matrix comprising a block G corresponding to the initial public key generation matrix. NG therefore comprises n blocks G along a row of the matrix and also b blocks G along a column of the matrix.

The matrix of the code G is a concatenation and a product of known Reed-Muller codes for example. Therefore, since RM(r,m) has a dimension=k=$\Sigma_{(i=0 \to i=r)}$binom(i,m) (with binom(i,m)=m!/(i!(m−i)!) and a length N=$2^m$, the public key will have the dimension (u*k)*(u*N).

For the decryption, the method executes u decodings d_i whereas the methods known from the prior art denote only one: (d_1, d_2, ..., d_u).

The benefit of this novel technique lies in the performance levels obtained and in the choice of the parameters. In practice, like this, the inventive cryptosystem is more parameterizable since there is a wide choice of parameters whereas, with the methods according to the prior art, these choices are imposed by the structure of the code. For example, for the Goppa codes: length N=$2^m$, dimension k=$2^m$−m−t. The complexity of the decoding algorithm depends quadratically on the length of the code, therefore the complexity for performing u decodings is lower than performing a decoding of length $2^{(m+\log_2(u))}$.

From this novel matrix NG, the method constructs public keys and private keys that will be used on transmission of the message to encrypt and decrypt. The construction of these keys is illustrated in FIG. 6.

The public key PUK used to encrypt the transmitted information is constructed by using a random invertible matrix RI, the novel matrix NG and a random permutation matrix RP.

The multiplication of RI with NG is a block multiplication. The multiplication on the left of the concatenated code by an invertible matrix is a block multiplication making it possible to obtain a matrix of rank uk. The following scheme applies:

RI (matrix multiplication by block) NG (conventional matrix multiplication) RP=public key PUK used in the method to decrypt the information received by a node.

The private key PRK used to encrypt the information to be transmitted at the level of a node in the method is made of RI and RP.

$Dim(RI) = u^2 \cdot (\Sigma_{(i=0 \to i=r)} Binomial(i,m))^2$; where Binomial $(i, m)$ is a function defined as follows $(m!/(i!(m-i)!))$ with m being the number of variables for the Reed-Muller code and r being the order of the Reed-Muller code RM(r,m).

$$Dim(RP) = u^2 \cdot (2^m)^2;$$

$$Dim(NG) = Dim(PUK) = (u\Sigma_{(i=0 \to i=r)} Binomial(i,m)) \cdot (u2^m).$$

Any other type of code can be used.

Figure 7:
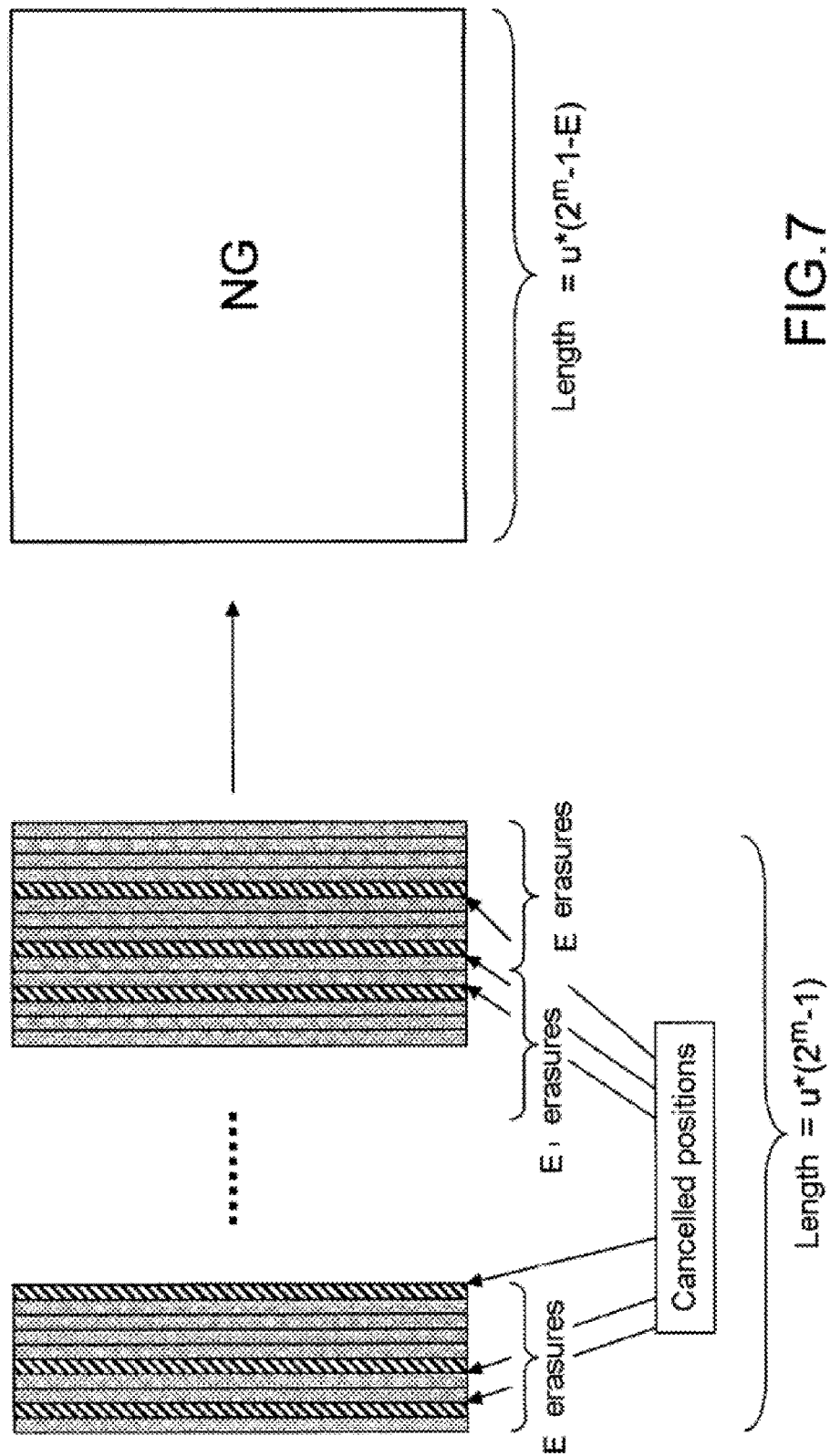

According to a variant embodiment, the method includes a step illustrated in FIG. 7 for reducing the length of the public key generated in FIG. 6.

It consists in eliminating certain columns from the matrix. The number of columns erased is determined, for example, according to the decoding algorithm used on receipt of the transmitted information. For example, for a decoding algorithm tolerating a maximum of t errors, there are t=a constructed errors+2(erasures E) of columns The value of the number of column erasures e is determined from t and from the desired transmission security.

It is thus possible to envisage the same number of erasures for all the blocks of the matrix NG.

Figure 8:
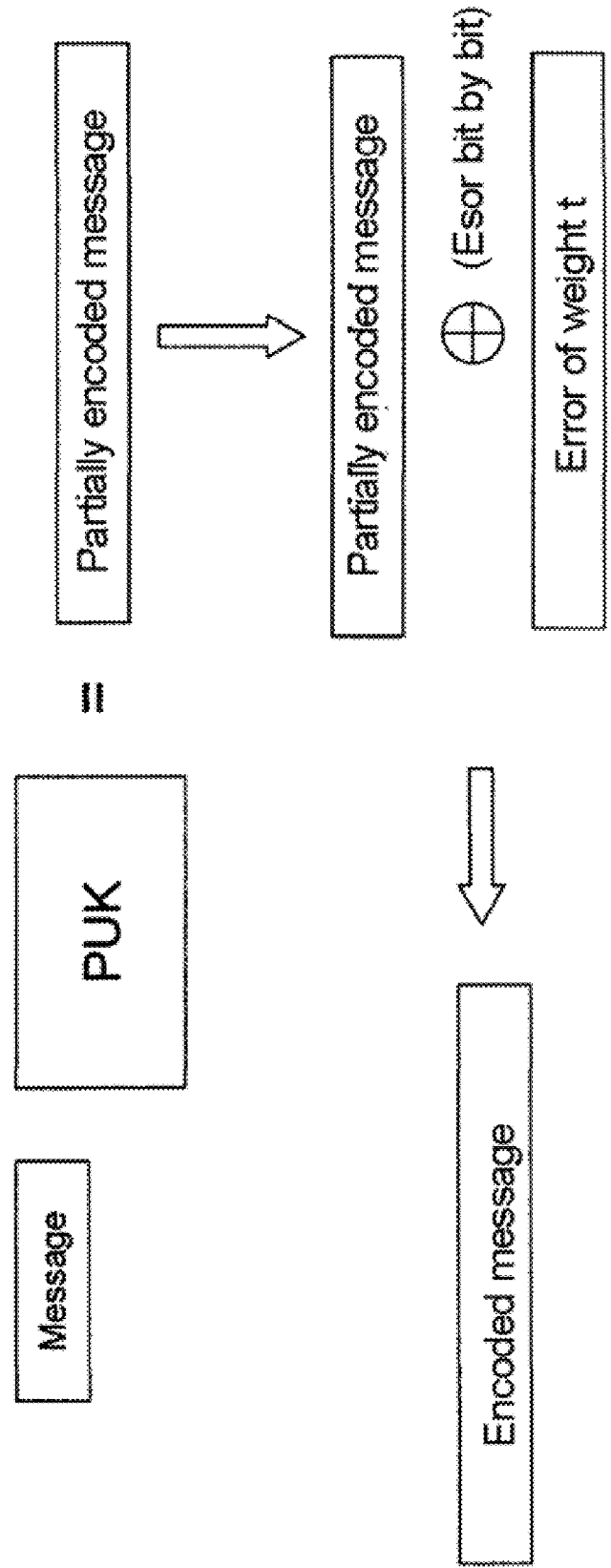

FIG. 8 represents an example of encoding or encryption of the information to be transmitted by using the key generated in FIG. 5. The message is encoded by using the key PUK, then a random error of fixed weight is added, according to the scheme of FIG. 3, for example.

To optimize information transmission security, the method adds, for example, extra dummy traffic before encrypting the information. A node of the network generates the traffic flow according to the space in the bandwidth.

According to an embodiment, an unencrypted information portion, for example, can be placed in the added error as described in: "public-key cryptosystems based on error correcting codes", Nicolas Sendrier, paper for authorization to direct research, specialty: information technology, University of Paris Mar. 6, 2002. This technique appears in the document by V. M. Sidel'nikov, "A public-key cryptosystem based on Reed-Muller codes", Discrete Mathematics and Applications, 4 (3):191-207.

Figure 9:
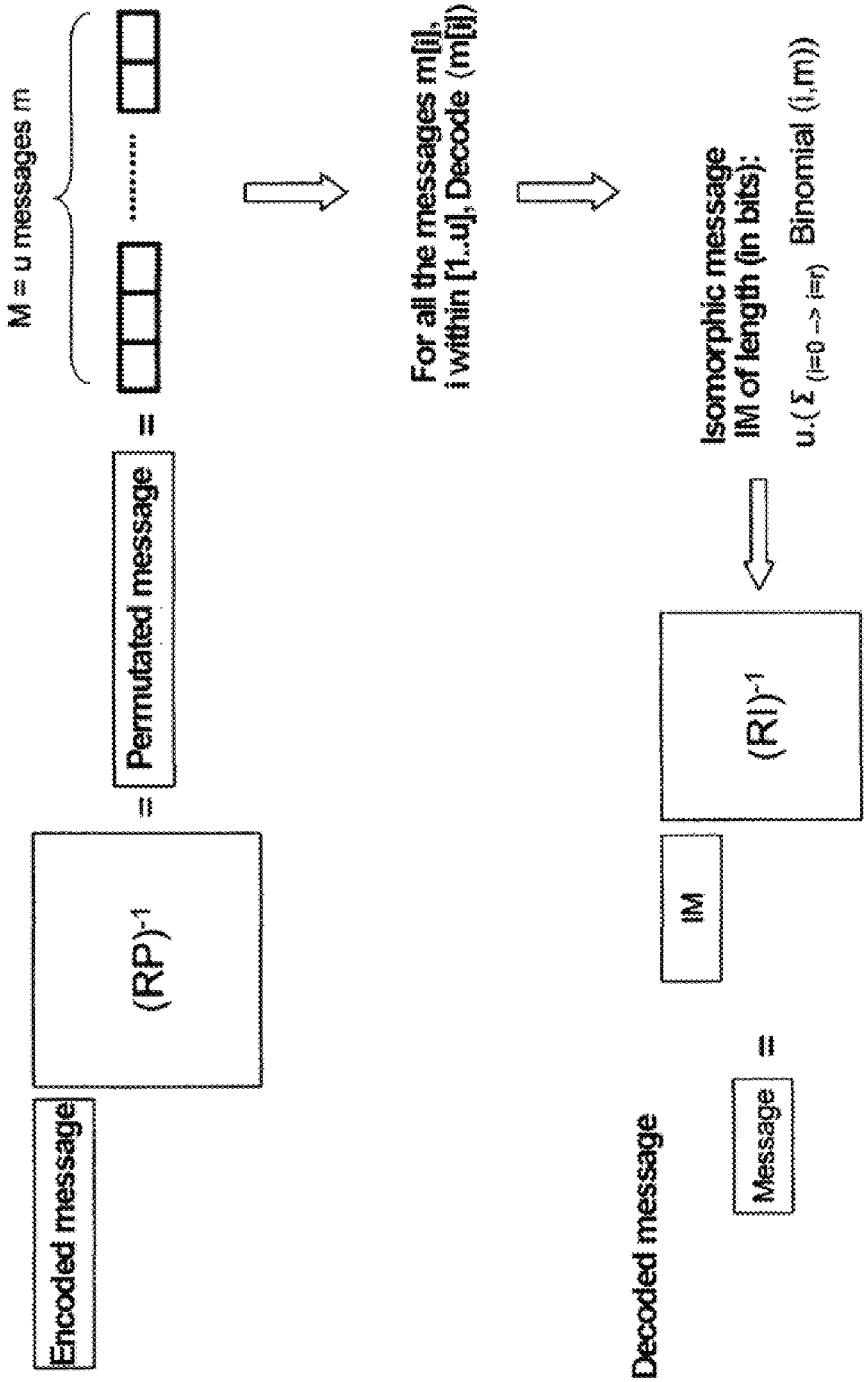

FIG. 9 represents an encrypted information decoding scheme according to the invention.

The coded message is decoded initially by the private key by using the inverse matrix of RP, there are u messages m, then the method uses the decoding algorithm u times.

for all the messages m[i] where i is an index varying from 1 to u (u being the size of the matrix), decode (m[i]).

For the erased positions, the method executes the following steps:
If I is an erased position, do M[i]=0
else, do $M[i]=(-1)^{Tab[t]}$; t:=t+1; with Tab[t] which corresponds to the vector y defined previously, t is, for example, the position of a bit in a message to be encrypted.

More generally, t corresponds to the position of a component of the vector y. t=t+1; the loop is executed for i within $[0 \ldots u2^m-1]$ where m is the parameter of the Reed-Muller code, $2^m$ is the length of the Reed-Muller code.

The message obtained is isomorphic IM of length (in bits):
$u \cdot (\Sigma_{(i=0 \to i=r)} Binomial(i,m))$.

The method then applies the private key RI, by using its inverse matrix $(RI)^{-1}$ to obtain the final decoded message.

The inventive method uses techniques known to those skilled in the art to transmit the public keys and the private keys generated. These key management techniques will therefore not be detailed.

The steps of the method described previously can be implemented in all the wired and wireless transmission systems that demand a level of security in transmission. Any communication system that demands high security constraints can use the invention.

The invention claimed is:

1. A method for securing transmission of information in a communication network having a plurality of nodes, the method comprising the steps of:
   encoding the information with a given code, by an information transmitting node;
   adding an error of given weight to the encoded information;
   dividing the encoded information and the error of given weight into a predetermined plurality of portions that are substantially equal to a predetermined number r of independent paths in the communication network to transmit the information in the network;
   encrypting a destination address of a destination node;
   associating a control information item for each portion, in order to reconstruct a message at the destination node and the encrypted destination address; and
   sending in parallel, over the r independent paths of the communication network, sets of data comprising a portion of the encoded information, the encrypted destination address and the control information item.

2. The method as claimed in claim 1, further comprising the step of using a Reed-Solomon code to encode the piece information to be transmitted.

3. The method as claimed in claim 1, further comprising the steps of:
   evaluating a capacity of a transmission channel; and
   adding a random error of fixed weight to the information, wherein the random error is dependent on a quality of this channel.

4. The method as claimed in claim 1, wherein the step of encrypting comprises encrypting the destination addresses of the destination node by use of a public key encryption system.

5. The method as claimed in claim 4, further comprising the steps of:
   generating a public key steps of:
      calculating a block matrix multiplication of RI with NG, to produce an intermediate product;
      calculating a matrix multiplication of the intermediate product with RP, to produce the public key,
   wherein:
      RI comprises a random invertible matrix used to form a first private key;

NG comprises a public key generation matrix having a plurality of elements G arranged as u columns and u rows, wherein each element G comprises a code generation matrix; and RP comprises a matrix obtained by random permutation used to form a second private key; and encoding information transmitted in the network by use of the public key and at least one of the first and second private keys.

6. The method as claimed in claim 5, further comprising a step of eliminating one or more predetermined columns of the public key generation matrix in order to reduce the size of the public key generation matrix.

7. The method as claimed in claim 6, wherein:
a number of columns eliminated in the public key generation matrix is equal in all blocks forming the matrix NG; and
a number of columns to be eliminated is determined from a decoding algorithm.

8. The method as claimed claim 1, wherein a portion of the information to be encrypted is incorporated into a random error added before the information is encoded.

9. The method as claimed in claim 6, wherein the method decodes encoded information by applying the steps of:
decoding the encoded message initially by the second private key by use of an inverse matrix of RP;
repeating the decoding step u times for each of the u messages m;
decoding messages m[i] for index i varying from 1 to u;
for each of the eliminated columns, execute the following steps for i within $[0 \ldots u2^m-1]$:
setting m[i]=0 if i corresponds to an eliminated column;
if i does not correspond to an eliminated column, then setting $m[i]=(-1)^{Tab[t]}$, wherein Tab[t] corresponds to a predetermined vector; and
incrementing t by a value of one; and
applying the first private key RI, by using its inverse matrix $(RI)^{-1}$ to obtain the final decoded message,
wherein m is a parameter of the Reed-Muller code, and $2^m$ is a length of the Reed-Muller code.

* * * * *